(12) United States Patent
Bravo Corbacho et al.

(10) Patent No.: US 12,403,830 B2
(45) Date of Patent: Sep. 2, 2025

(54) EXTERNAL REAR-VIEW MIRROR FOR VEHICLES AND A SET OF REAR-VIEW MIRRORS

(71) Applicant: FicoMirrors, S.A.U., Barcelona (ES)

(72) Inventors: David Bravo Corbacho, Viladecavalls (ES); Robert Lopez Galera, Viladecavalls (ES)

(73) Assignee: FICOMIRRORS, S.A.U., Barcelona (ES)

( * ) Notice: Subject to any disclaimer, the term of this patent is extended or adjusted under 35 U.S.C. 154(b) by 34 days.

(21) Appl. No.: 18/302,381

(22) Filed: Apr. 18, 2023

(65) Prior Publication Data

US 2023/0339398 A1 Oct. 26, 2023

(30) Foreign Application Priority Data

Apr. 26, 2022 (EP) ..................................... 22382398

(51) Int. Cl.
B60R 1/072 (2006.01)
(52) U.S. Cl.
CPC .................................. B60R 1/072 (2013.01)
(58) Field of Classification Search
CPC ........... B60R 1/072; B60R 1/06; B60R 1/074; B60R 1/1207; B60R 2001/1253; B60R 1/12
USPC ....................................................... 359/877
See application file for complete search history.

(56) References Cited

U.S. PATENT DOCUMENTS 4,502,759 A 3/1985 Herzog et al.
7,645,044 B2 1/2010 Lee
2013/0057976 A1* 3/2013 Assmann .................. B60R 1/06
359/872
2014/0376119 A1* 12/2014 Sobecki .................. B60R 1/082
359/841
2017/0282803 A1 10/2017 Sugimura et al.

FOREIGN PATENT DOCUMENTS

WO 2019040711 A1 2/2019

OTHER PUBLICATIONS

European Application No. 22382398.0 filed Apr. 26, 2022; Extended European Search Report dated Nov. 2, 2022; 7 pages.

* cited by examiner

Primary Examiner — Wyatt A Stoffa
Assistant Examiner — Rahman Abdur
(74) Attorney, Agent, or Firm — CANTOR COLBURN LLP

(57) ABSTRACT

An external rear-view mirror assembly for vehicles includes a mirror housing with an opening, a frame assembled at the opening of the mirror housing, a mirror pane, an actuator accommodated inside the mirror housing and adapted for adjusting the position of the mirror pane relative the mirror housing, such that the mirror pane is inclined with respect to a coupling surface of the actuator, or wherein the mirror pane is inclined with respect to a second contact surface of the actuator, or inclined with respect to an orthogonal direction to a fixing direction of fixing means of the actuator. The external rear-view mirror assembly may define a set of external rear-view mirrors that features a symmetrical configuration both, from an aerodynamic and from a visual appearance point of view, and that it is optimized optically to provide individualized fields of view in the driver and passenger-side rear-view mirrors.

20 Claims, 8 Drawing Sheets

EXTERNAL REAR-VIEW MIRROR FOR VEHICLES AND A SET OF REAR-VIEW MIRRORS

CROSS-REFERENCE TO RELATED APPLICATIONS

This application claims the benefit of European Application Serial No. 22382398.0 filed Apr. 26, 2022, the disclosure of which is incorporated herein by reference in its entirety.

BACKGROUND

The present invention relates to the manufacture of external rear-view mirrors for vehicles.

An object of the invention is the provision of an external rear-view mirror and a set of external rear-view mirrors for a vehicle that features a symmetrical configuration, both, from an aerodynamic and from a visual appearance point of view, and that it is optimized optically to provide individualized fields of view in the driver-side rear-view mirror and in the passenger-side rearview mirror.

Conventionally, motor vehicles are fitted with a set of external rear-view mirrors, namely a driver-side rear-view mirror and a passenger-side rear-view mirror, wherein each mirror in turn comprises: a mirror housing with an opening, a frame assembled at the opening of the mirror housing, an actuator and a back plate coupled with the actuator, both accommodated inside the mirror housing, and a mirror pane mounted on the back plate, such that the position of the mirror pane relative to the mirror housing is adjustable by means of the actuator.

Due to the off-centred position of the driver, different angles of inclination for the drive-side mirror pane and for the passenger-side mirror pane according to current regulations are required, as represented in FIG. 1, in order to provide the driver with proper rear-view fields of view at both sides of the vehicle.

In addition, the arrangement and construction of the mirror assemblies should be as symmetrical as possible, such that, the aerodynamic configuration and visual appearance is as optimal as possible.

Furthermore, since the same vehicle can be produced for markets where the driver's position may vary, namely: right-hand or left-hand drive, with the arrangement of mirrors as symmetrical as possible, saving in: tooling, moulds and internal components, is achieved.

Therefore, maintaining the wanted symmetry according to the regulations in both rear-view mirrors, and providing at the same time proper field of views for the driver, remains a challenge for the manufacturers. Normally, this is solved by providing a larger mirror pane in the passenger-side mirror than the one in the driver-side mirror, or by providing two mirror panes of the same size, so that the one for the driver-side is oversized according to the regulation's requirements.

Therefore, there is still room for improving the design and manufacturing of this type of products.

SUMMARY

The invention is defined in the attached independent claim.

A first aspect of the invention refers to an external rear-view mirror assembly for vehicles, wherein the assembly comprises: a mirror housing with an opening, a frame assembled at the opening of the mirror housing, a mirror pane (such as a mirror glass substrate with a reflective surface, an electro-chromic reflective element or an electro-optic reflective element, having or not a reflective surface), and an actuator accommodated inside the mirror housing.

The actuator has a fixed part and a movable part relative the fixed part, and the movable part is driven by at least one electric motor, preferably two electric motors, for adjusting the position of the movable part relative the fixed part in a known manner in at least two directions, preferably, roll and pitch directions, thereby, adjusting the mirror pane attached to the movable part of the actuator, relative to the mirror housing.

The movable part of the actuator has a coupling surface contained in a plane, and the mirror pane is attached directly or indirectly through an intermediate or intermediate elements, such as a back plate, to the movable part of the actuator by means of that coupling surface. According to the invention the mirror pane is inclined with respect to that coupling surface of the actuator.

In addition, the actuator has a first contact surface and the mirror pane or at least one intermediate element having a second contact surface for contacting with the actuator's first contact surface when the mirror pane is attached to the actuator. According to the invention, as an alternative, the mirror pane is inclined with respect to that first contact surface of the actuator.

The actuator is provided with fixing means, for example screws, placed for attaching the actuator inside the mirror housing in a specific fixing direction, and in accordance with the invention as another alternative, the mirror pane, is inclined with respect to an orthogonal direction to said fixing direction of said fixing means in the initial position.

By initial position, it is understood when the fixing direction is placed orthogonal the coupling surface of the actuator.

The assembly may further comprise a back plate as an intermediate element, coupled with the actuator, such that the mirror pane is mounted on the back plate. The back plate also has a contacting surface contained in a plane, such that the actuator and the back plate are configured to be coupled to each other by overlapping their respective contacting surfaces. The back plate is additionally configured such that when the mirror pane is mounted on the black plate, the mirror pane defines an angle (C. °) with respect to the contacting surface of the actuator, or with respect the coupling surface of the actuator or with respect to the fixing direction of the actuator's fixing means. Preferably, the angle (C. °) is within the range 3°-8°, more preferably, within the range of 4°-6°, and optimally 5°.

Typically, in practical implementations, the mirror pane may have a constant thickness or flat surface, variable thickness as triangular prismatic reflective elements (wedge shape), or even slightly curved thickness. But for the flat surface and slightly curved shape in connection with the angle (C. °), that curvature is disregarded, and the mirror pane could be considered as a flat surface in both shapes.

In the case of triangular prismatic reflective elements, where the mirror pane is inclined with respect to an actuator element by having two oblique surfaces, we refer to the surface closest to the actuator when the mirror pane is attached to the actuator.

The back plate may include a supporting plate having an outer surface for receiving the mirror pane, and a coupling body affixed to an internal surface of the supporting plate. This coupling body is configured to be anchored to the actuator, and the thickness or height of the coupling body from the internal surface, progressively increases from one side of the coupling body to other side of the same, in order to provide the desired inclination of the mirror pane.

As an alternative, the supporting plate may have a tapered shape, wherein the external surface and the internal surface may be inclined with respect to each other, and the coupling body affixed to the internal surface configured to be anchored to the actuator may have a height or thickness constant or with a progressively increase from one side of the coupling body to other side of the same, in order to provide the desired inclination of the mirror pane.

Preferably, the assembly is configured such that while adjusting the position of the mirror pane by means of the actuator, the mirror pane would always be in its entirety contained inside the mirror housing and frame assembled together, that is, no part of the mirror pane would protrude outside the frame.

During the adjustment operation of the mirror pane once it is mounted on the vehicle, it shall be adjusted in at least two axes, the first one substantially in a vertical direction with respect to the ground (yaw) and the second one in a direction substantially parallel to the ground and perpendicular to the longitudinal axis of the vehicle (pitch).

In the vertical adjustment (yaw), the actuator can adjust the mirror pane in both directions by at least 7°, preferably at least 10° from an initial position.

Preferably, in the vertical adjustment (yaw), the motor when rotating in both directions, does not rotate more than 5° in one direction more than in the other.

Another aspect of the invention refers to a set of external rear-view mirrors for vehicles, comprising two assemblies of external rear-view mirror assemblies for vehicles, wherein each assembly comprises: a mirror housing with an opening, a frame assembled at the opening of the mirror housing, a mirror pane (such as: a mirror glass substrate with a reflective surface, an electro-chromic reflective element or an electro-optic reflective element, having or not a reflective surface), and an actuator accommodated inside the mirror housing. The actuator is driven by at least one electric motor, preferably two electric motors, for adjusting the position of the mirror pane relative the mirror housing in a known manner. One assembly is configured as driver-side rear-view mirror assembly, and the other assembly is configured as passenger-side rear-view mirror assembly. The mirror housings of both assemblies are conformed as a mirror image of each other, so that they can be placed in a symmetrical arrangement with respect to a plane of symmetry.

In addition, the frames of both sides are shaped to have the outermost visible surface (when the frame is installed in the mirror housing) symmetrical to each other. Depending on the case, the entire frame may be symmetrically shaped or, preferably, the internal part of the frame (the part not seeing from the exterior once is attached to the mirror housing) may be asymmetrically shaped to improve the driver's view of the mirror pane.

Preferably, the frames of the assemblies are asymmetrical constructed in order to be adapted in shape to provide a vehicle's driver, a proper angle of vision of the mirror pane of the driver side and of the passenger side. In other words, the mirror housings attached to their respective frames of both assemblies are shaped such that when they are operatively attached to a vehicle as driver-side rear-view mirror assembly, and as passenger-side rear-view mirror assembly, they are symmetrical to each other when viewed from a front view of the vehicle and from a top plan view of the vehicle.

Preferably, the assemblies of the set are the assembly of the first aspect of the invention defined above.

Additionally, when the two assemblies are placed in that symmetrical arrangement, the mirror panes of both assemblies are inclined with respect to the plane of symmetry, and the inclination of the mirror pane of the passenger-side rear-view mirror assembly, is different than the inclination of the mirror pane of the driver-side rear-view mirror assembly. In this manner, the set is optimized optically to provide individualized fields of view in the driver-side rear-view mirror and in the passenger-side rearview mirror according to the regulations.

The above-mentioned inclinations of the mirror panes may be obtained due to the configuration of the respective back plates, that is, the back plate of both assemblies are configured such that the inclination of the mirror pane of the passenger-side rear-view mirror assembly, is different than the inclination of the driver-side rear-view mirror assembly.

When the driver-side rear-view mirror assembly and the passenger-side rear-view mirror assembly are positioned in the symmetrical arrangement with respect to the plane of symmetry, the mirror pane of the driver-side rear-view mirror assembly defines an angle (a°) with respect to a plane orthogonal to the plane of symmetry, and the mirror pane of the passenger-side rear-view mirror assembly defines an angle (b°) with respect to the same plane orthogonal to the plane of symmetry, and wherein the angle (b°) is different, and in this case, greater than the angle (a).

This plane of symmetry might be considered as the longitudinal plane of the vehicle, or a vertical plane to the ground in the direction of vehicle motion passing through the centre of the vehicle.

Preferably, the angle (a°) is within the range 15°-17°, and the angle) (b°) is within the range 25°-27°. More preferably, the angle (a°) is 16°, and the angle) (b°) is 26°.

Furthermore, when the two assemblies are positioned in the symmetrical arrangement with respect to the plane of symmetry, the actuators are also symmetrically arranged with respect to each other.

Each assembly includes a mirror foot conformed to be the attached to a vehicle. The mirror housing is coupled with the mirror foot and it is rotatable manually or electrically with respect to the mirror foot. Preferably, the mirror foot of the two assemblies are constructed as a mirror image of each other.

Furthermore, each frame has an internal part and an external part, the internal part is the one that is not seeing from the top view when the frame and mirror housing are coupled together, whereas the external part is the one that is externally visible when these two components are assembled. According to the invention, the external parts are symmetrical to each other.

Preferably, when the two assemblies are positioned in the symmetrical arrangement with respect to the plane of symmetry, the outermost edge of the frames of each assembly defines a plane and that plane defines an angle (X°) with respect to the plane orthogonal to the plane of symmetry. Preferably, the angle (X°) is within the range 19°-23°. More preferably, the angle (X°) is 21°.

Furthermore, when the two assemblies are positioned in the symmetrical arrangement with respect to the plane of symmetry, the actuators are also symmetrically arranged with respect to each other. Preferably, the actuators are arranged perpendicularly respect to (X°.)

The invention allows the manufacture of symmetrical mirror housings of external rear view mirrors, with reduced tooling. Currently, it uses to be two versions of asymmetric mirror housings to be manufactured, one for left-driven vehicles and another one for right-driven vehicles, and in each version there are two types of mirrors, one for the driver's side and the one for the passenger's side, so that, four different housings are required, that implies that four different moulds and tooling are needed to manufacture the whole range of mirrors.

Therefore, an advantage of the invention is that only two types of mirror housings have to be manufactured to cover the whole range of external rear-view mirrors, as the mirror housings for the driver side and for the passenger side are constructed symmetrically.

An additional advantage of the invention, is that the actuators for the driver side and for the passenger side mirrors, are also symmetrically constructed, so that the interior components of the mirror such as: brackets, supports etc., can also be symmetrically constructed, so that manufacturing is additionally simplified and made cost-effective.

BRIEF DESCRIPTION OF THE DRAWINGS

To complete the description and in order to provide a better understanding of the invention, a set of drawings is provided. These drawings form an integral part of the description and illustrate embodiments of the invention, which should not be interpreted as restricting the scope of the invention, but just as examples of how the invention can be carried out. The drawings comprise the following figures.

DETAILED DESCRIPTION

Figure 1:
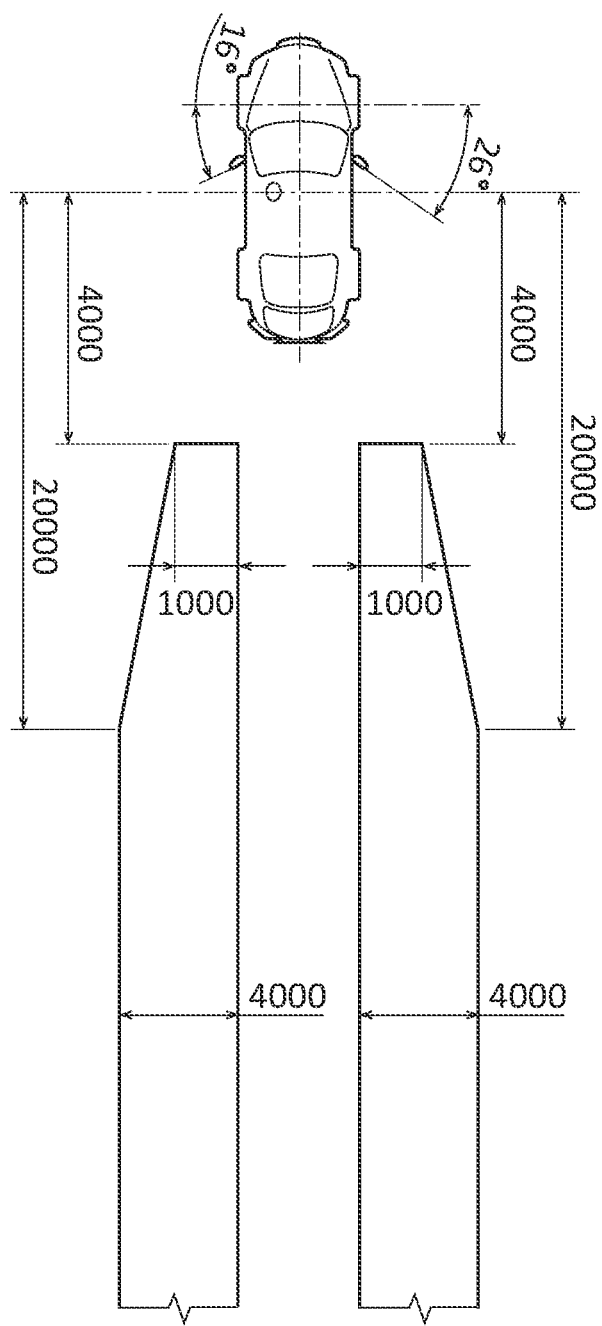
FIG. 1 is a schematic representation of the rear-views fields of view for a driver side and for a passenger side of a vehicle, according to the current regulations.
Figure 2A:
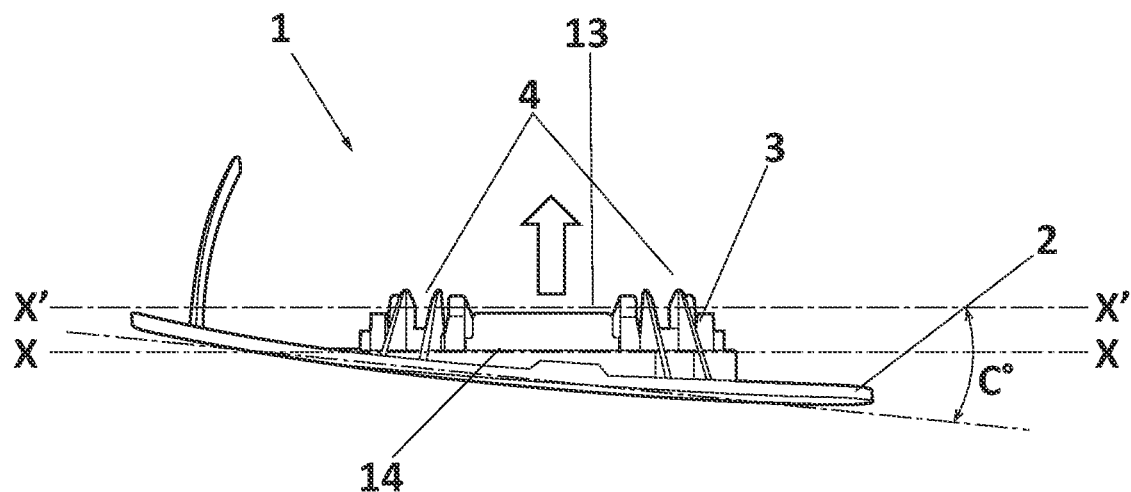
FIG. 2A shows a top plan view of a back plate for a rear-view mirror in accordance with a non-limiting example.

FIG. 2A shows a front elevational view of a back plate (1) for an external rearview mirror assembly (7,7') according to the invention, wherein the back plate (1) includes a supporting plate (2), in the example with a slightly curved shape, having an outer surface for receiving a mirror pane, and a coupling body (3) affixed or integrally formed to an internal surface of the supporting plate (2). The coupling body (3) has a coupling surface (13) contained in a plane (X'-X') meant to get attached to an actuator in the direction indicated by the arrow of the figure, by means of flexible tabs (4) formed in the coupling body (3).

Additionally, the back plate (1) has a contact surface (14) contained in a plane (X-X) and provided for contacting with a contacting surface (16) of an actuator (6).

The thickness or height of the coupling body (3) from the internal surface of the supporting plate (2), progressively increases from one side of the coupling body to other side of the same, in a way that supporting plate (2) is inclined with respect to the plane (X'-X'). The angle of inclination (C. °) between the plane (X'-X') and the outer surface of the supporting plate (2), is within the range 3°-8°.

Figure 2B:
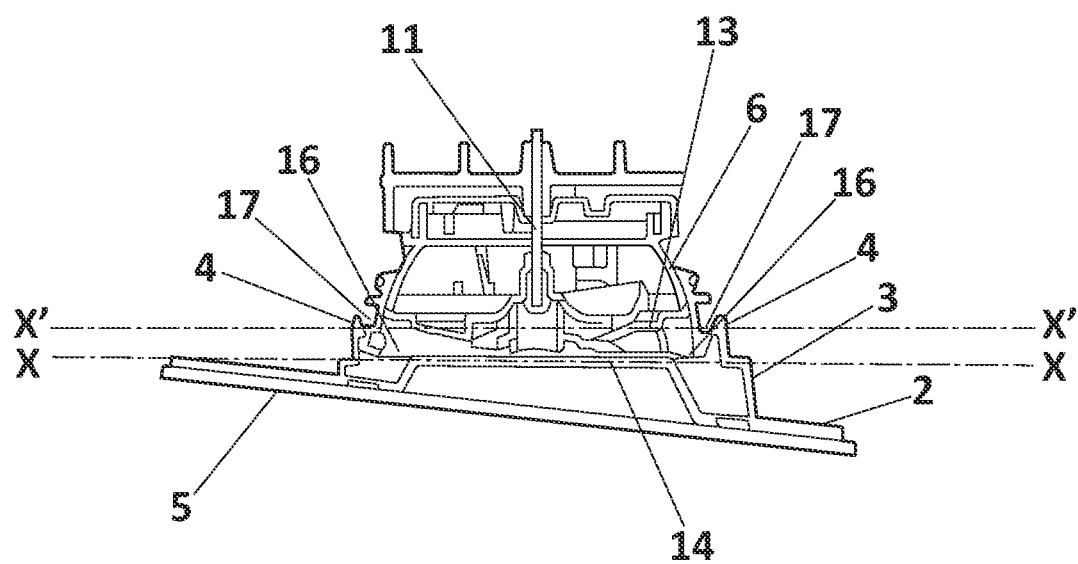
FIG. 2B shows the back plate for the rear-view mirror of FIG. 2A anchored to an actuator, in accordance with a non-limiting example.

With this configuration and as shown in FIG. 2B, when the back plate (1) is anchored to an actuator (6) by means of the coupling body (3) and its flexible tabs (4), the contacting surface (16) of the actuator (6) is contacting at the contact surface (14) of the back plate (1) and it is retained by the flexible tabs (4) at the coupling surface (17) of the actuator (6). A mirror pane (5) is mounted on the external surface of the supporting plate (2), and the mirror pane (5) is inclined with respect to the coupling surface (17) of the actuator, and also inclined with respect to the contacting surface (16) of the actuator (6).

Conventionally, the actuator (6) has at least two differentiate parts, a fixed one, and a movable one relative to the fixed one that is rotatable about a rotation point (not shown) in at least two directions to adjust the position of the mirror pane (5).

As shown in FIG. 2B, the actuator (6) is provided with fixing means, for example screws, placed for attaching the actuator (6) inside the mirror housing (8) in a specific fixing direction (11), and the mirror pane (5) or the surface of the mirror pane closest to the actuator (6), is inclined with respect to an orthogonal direction to said fixing direction (11) when the actuator (6) is in an initial position when the fixing direction (11) is placed orthogonal the coupling surface (17) of the actuator (6).

Figure 3A:
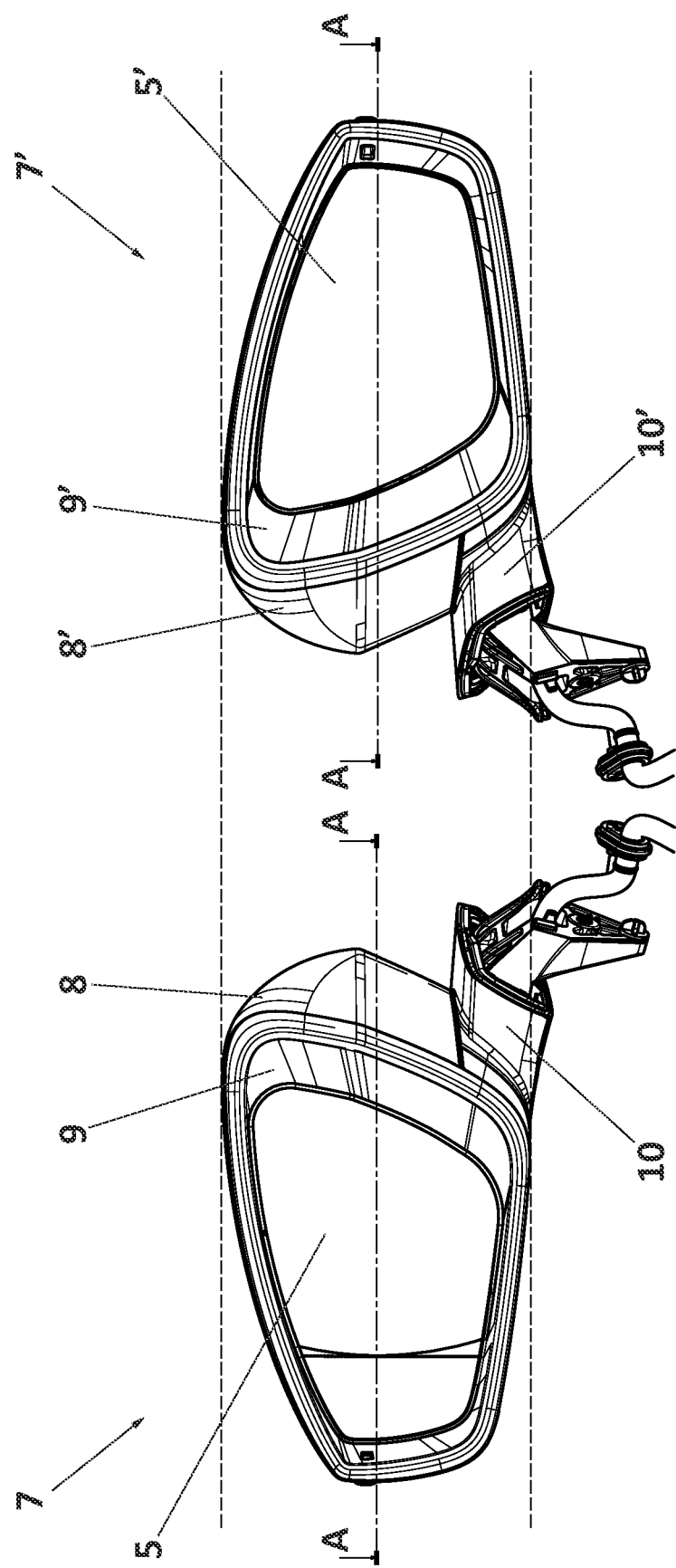
FIG. 3A depicts rearward perspective view of a set of two rear-view mirror assemblies, in accordance with a non-limiting example.

FIG. 3A shows two external rear-view mirror assemblies (7, 7') each one composed of a mirror housing (8,8') (that could be formed by a skull cap or top cover and a lower cover) with an opening, a frame (9,9') in the form of a loop assembled at the opening of the mirror housing, and a mirror pane (5,5') accommodated inside the mirror housing (8,8') and visible through the opening.

Additionally, each assembly (7, 7') includes a mirror foot (10,10') conformed to be attached to a vehicle, such that the mirror housing (8,8') is coupled with the mirror foot (10,10') and it is rotatable with respect to the mirror foot (10,10'), for example between a driving position and a parking position.

Figure 3B:
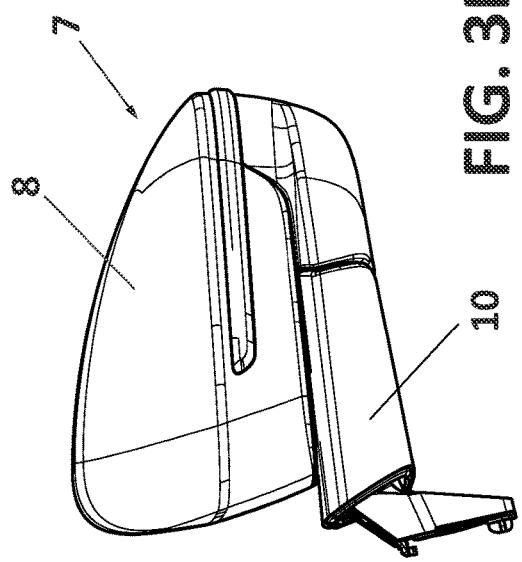
FIG. 3B depicts a frontal perspective view of the set of two rear-view mirror assemblies of FIG. 3A, in accordance with a non-limiting example.

As represented in FIG. 3B, in each assembly (7, 7'), the mirror pane (5,5') is mounted on a back plate (1,1') which in turn is anchored to an actuator (6,6') as described above, through an opening of the respective frame (9,9').

Figure 3C:
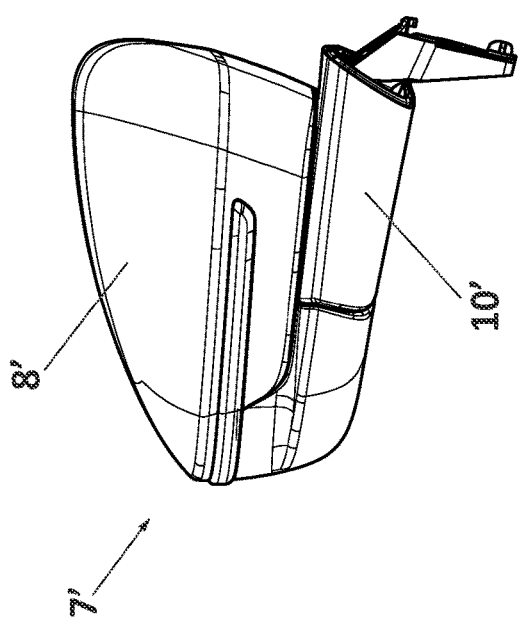
FIG. 3C a top plan view of the set of two rear-view mirror assemblies of FIG. 3A, in accordance with a non-limiting example.
Figure 3C:
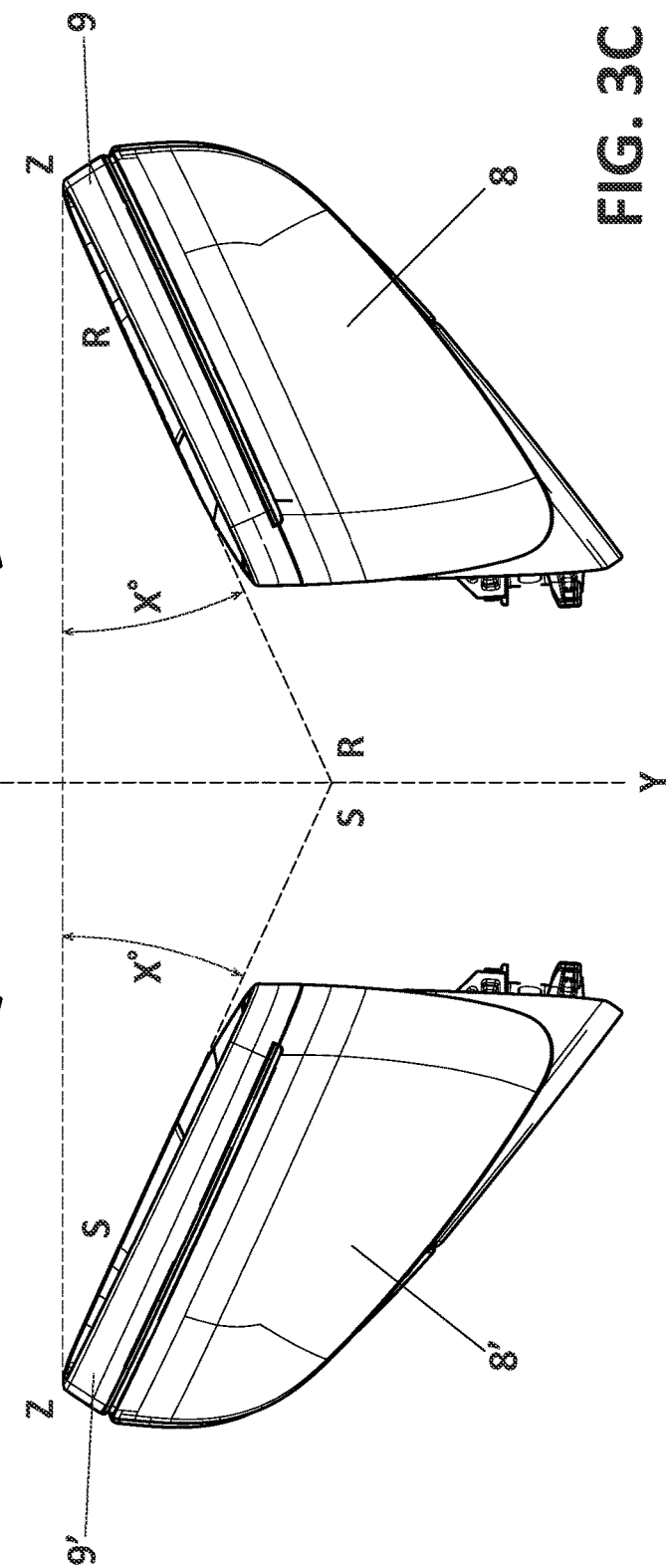
Figure 3D:
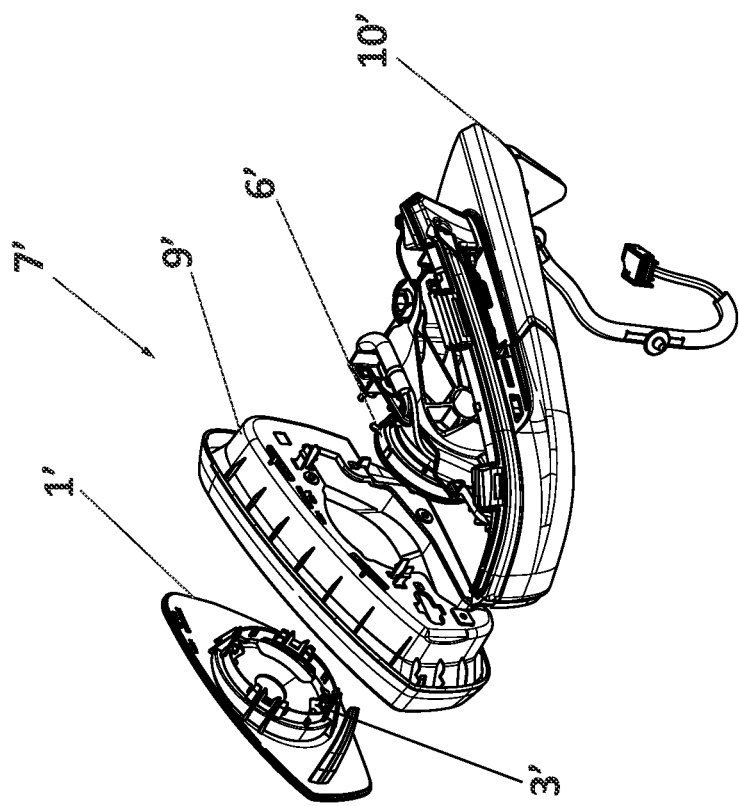
FIG. 3D depicts a disassembled view of the two rear-view mirror assemblies of FIG. 3A without mirror housings.
Figure 3D:
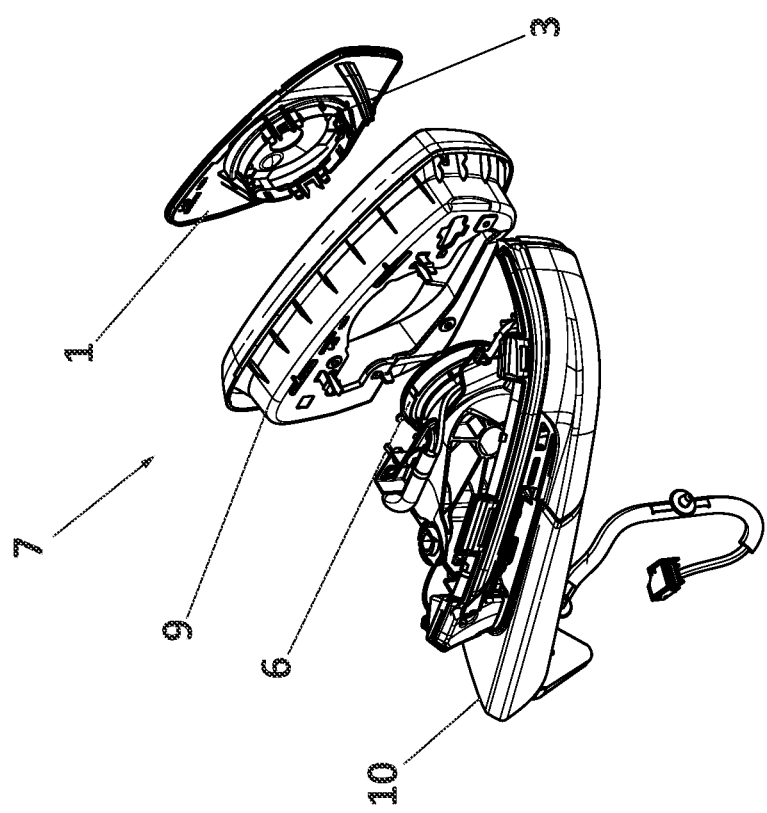
Figure 4:
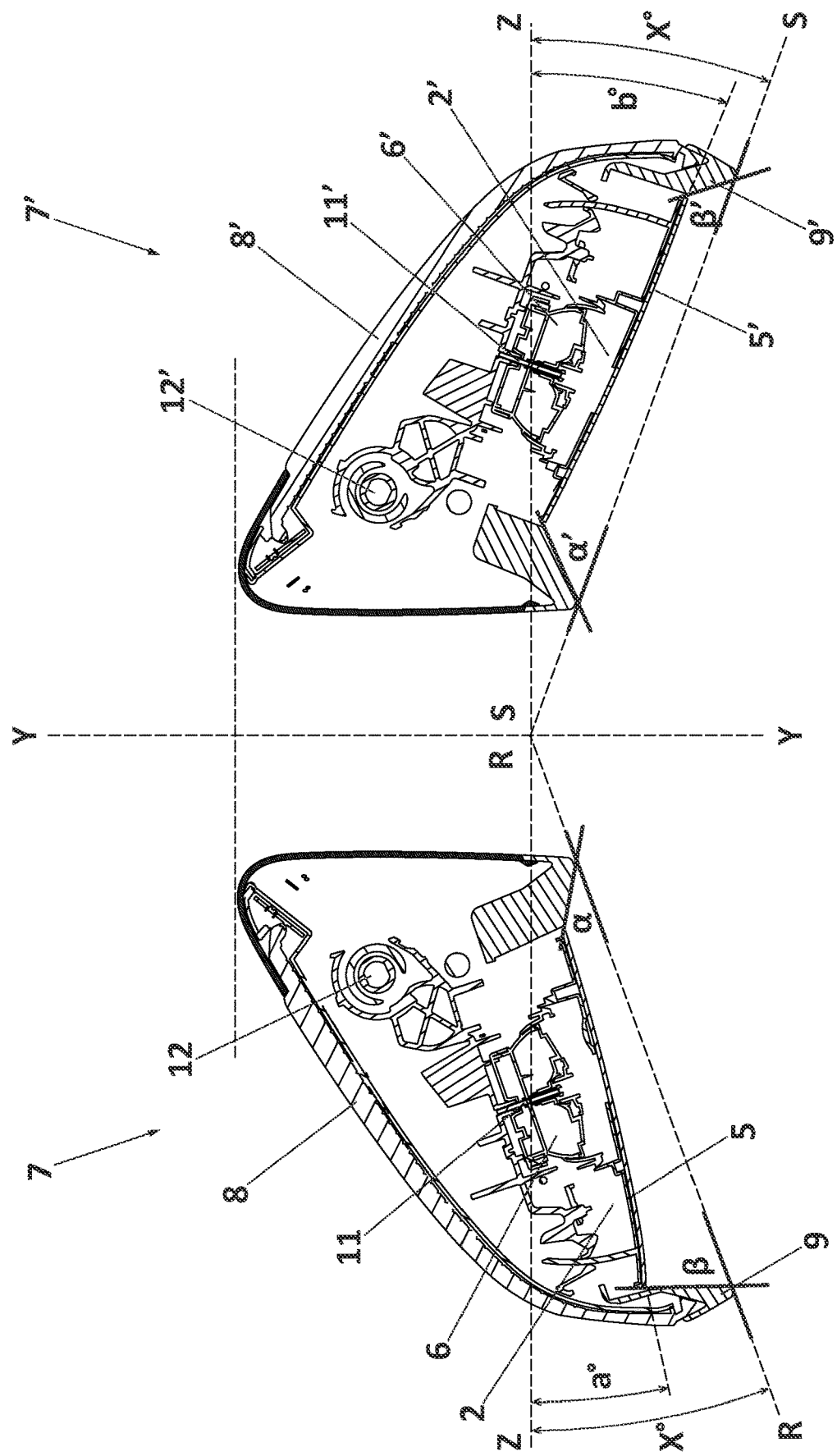
FIG. 4 shows a top plan cross-sectional view of the set of two rear-view mirror assemblies, positioned in a symmetric arrangement taken along the line A-A in FIG. 3A, in accordance with a non-limiting example.

FIG. 4 shows a set of external rear-view mirrors for a vehicle, comprising two assemblies (7,7') as the one defined above in connection with FIG. 3, wherein one assembly (7) is configured as driver-side rear-view mirror assembly, and the other assembly (7') is configured as passenger-side rear-view mirror assembly. The mirror housings (8,8') of both assemblies (7,7') are conformed as a mirror image of each other, so that they can be placed in the symmetrical arrangement represented in FIG. 4, with respect to a plane of symmetry (Y-Y), that typically corresponds to the longitudinal plane of symmetry of a vehicle.

Furthermore, the frames (9,9') of both assemblies (7,7') are also conformed to have their external and visible parts (when the frame is installed in the mirror housing) symmetrical to each other.

Therefore, the mirror housings (8,8') of both assemblies (7,7') attached with their respective frames (9,9') are shaped such that when they are operatively attached to a vehicle, they are symmetrical to each other when viewed from a front view of the vehicle and from a top plan view of the vehicle, as shown in FIGS. 3B and 3C respectively.

When the two assemblies (7,7') are placed in that symmetrical arrangement, the mirror panes (5,5') of both assemblies are inclined with respect to the plane of symmetry (Y-Y), and wherein the inclination of the mirror pane (5') of the passenger-side rear-view mirror assembly (7'), is different than the inclination of the mirror pane (5) of driver-side rear-view mirror assembly (7).

More specifically, the mirror pane (5) of the driver-side rear-view mirror assembly (7) defines an angle (a°) with respect to a plane (Z-Z) orthogonal to the plane of symmetry (Y-Y), and the mirror pane (5') of the passenger-side rear-view mirror assembly (7') defines an angle (b°) with respect to the same plane (Z-Z), and the angle (b°) is greater than the angle (a°).

Figure 5:
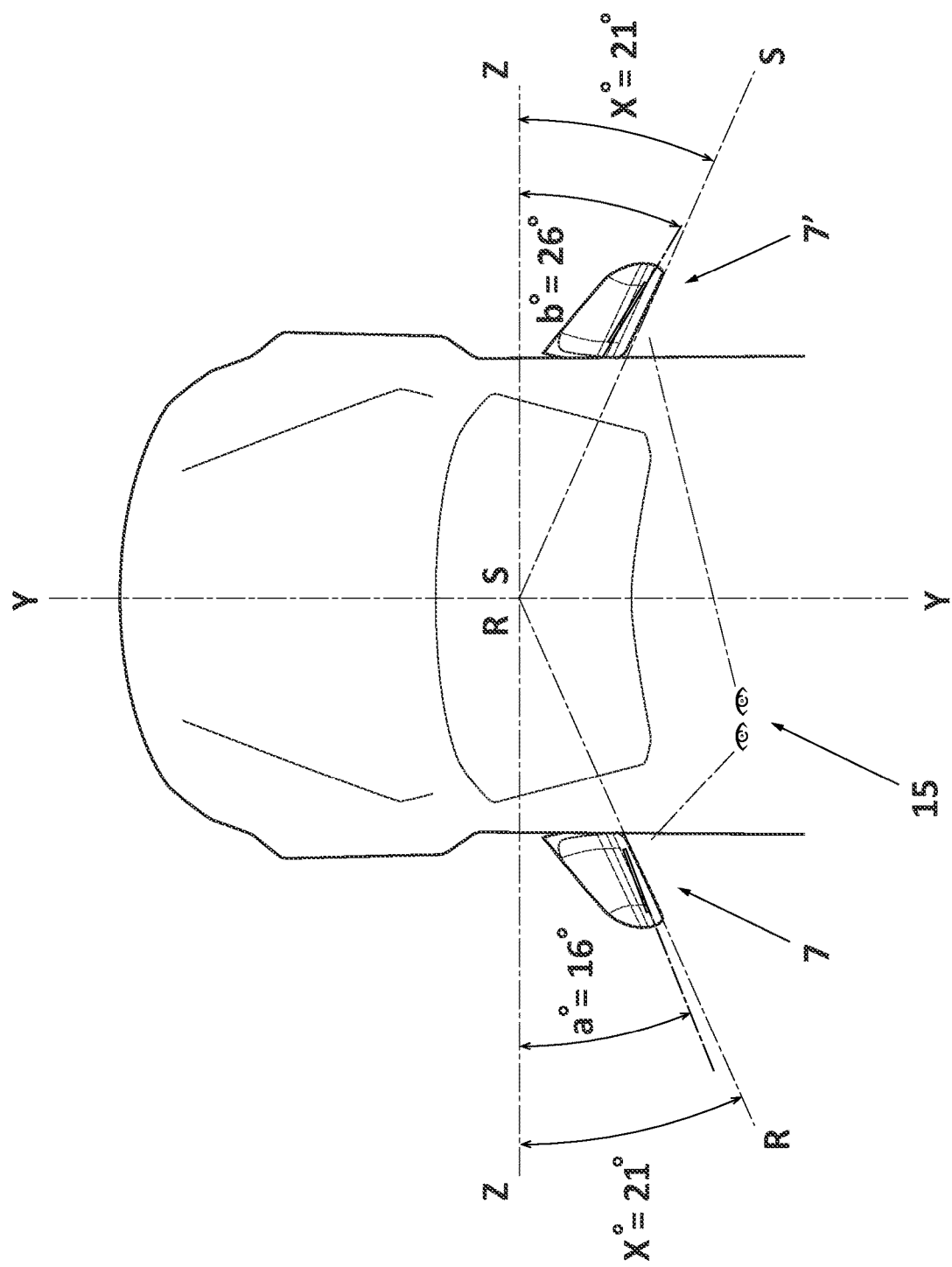
FIG. 5 shows a schematic representation in a top plan view of the set of rear-view mirror assemblies of FIG. 2A installed on a vehicle, in a symmetrical arrangement, wherein mirror frame angles and mirror pane angles are indicated by broken lines, in accordance with a non-limiting example.

As represented in FIG. 5, the angle (a°) is within the range 15°-17°, and the angle (b°) is within the range 25°-27°. More preferably, the angle (a°) is 16°, and the angle (b°) is 26° with a regulation range in both cases of +/−15°.

As described before, the two mirror housings (8,8') are symmetrical to each other when viewed in a top plan view of the vehicle as shown in FIG. 5. This is also represented in FIG. 4, wherein it can be appreciated that the outermost points of each frame (9,9') defines planes (R-R), (S-S) respectively, inclined with respect to the orthogonal plane (Z-Z), and that the angle (X°) between these planes (R-R), (S-S) and the orthogonal plane (Z-Z) is substantially the same. The angle (X°) preferably is 21°.

Additionally, as shown in FIG. 4, the two actuators (6,6') have the same shape and dimensions, that is, they are a copy of each other, and they are also symmetrically arranged with respect to each other.

Preferably, the frames (9,9') of the assemblies (7,7') are asymmetrical in order to be adapted in shape to provide a vehicle's driver, a proper angle of vision of the mirror pane (5) of the driver side (5) and of the passenger side (5'). This feature is represented in FIG. 4, wherein it can be noted that an inner part (a part closer to the plane of symmetry (Y-Y) and not externally seen from a top view) of each frame (9,9') define angles (α,α') respectively with respect to the planes (R-R), (S-S), and that the angle (α') of the passenger side frame (9') is different, in the example, greater than the angle (α) of the driver side frame (9').

Furthermore, an outer part (a part distanced from the plane of symmetry (Y-Y) and not externally seen from a top view) of each frame (9,9') define angles (β,β') respectively with respect to the planes (R-R), (S-S), and that the angle (β) of the driver side frame (9), is different, in the example, greater than the angle (β') of the passenger side frame (9').

Figure 6:
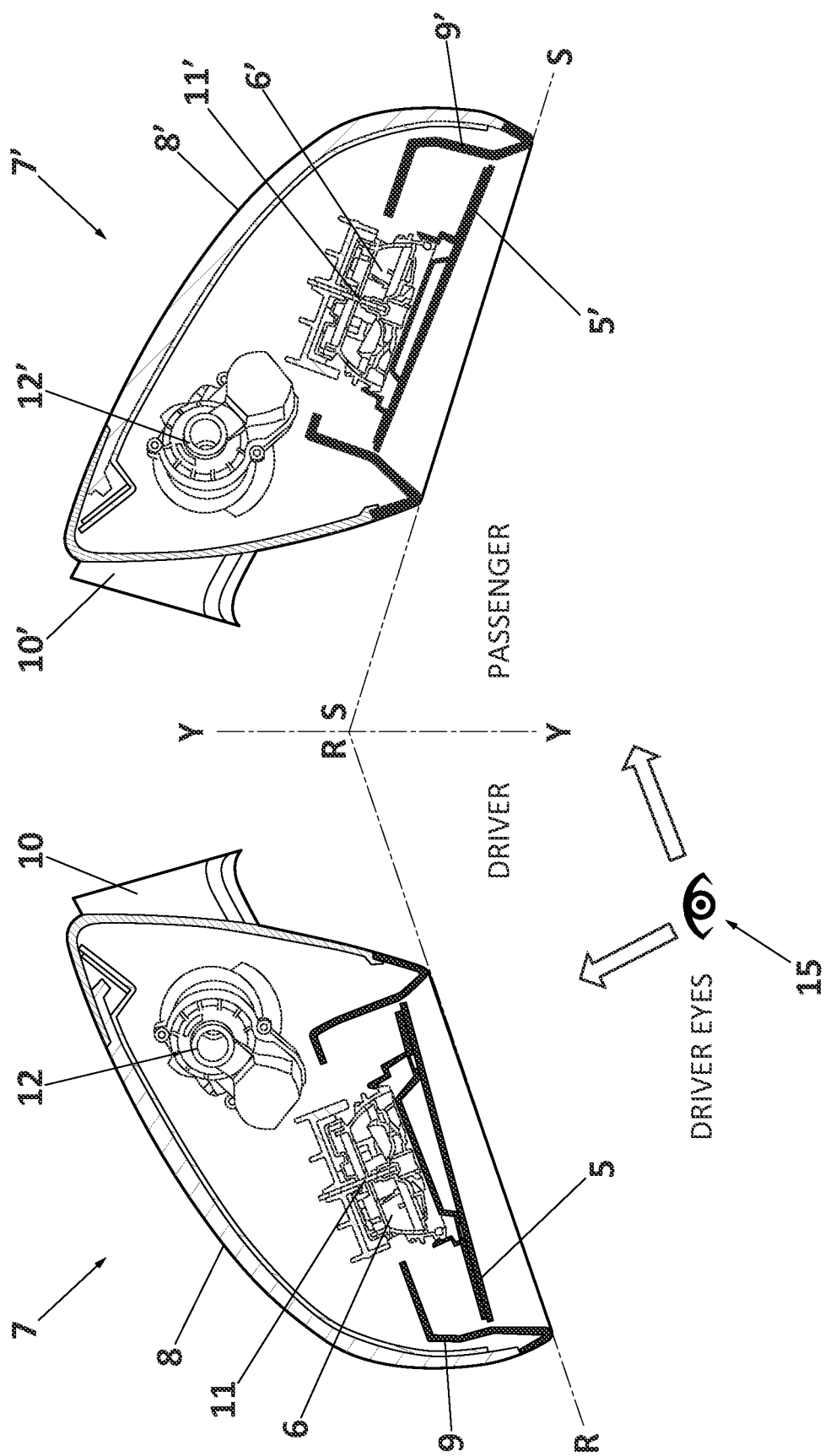
FIG. 6 shows another top plan view of the set of two rear-view mirror assemblies of FIG. 2A, positioned in a symmetric arrangement, in accordance with a non-limiting example.

FIG. 6 shows a more detailed representation of the set of rear view mirror assemblies (7, 7'), including respective mirror foot (10,10') and second actuators (12,12') received also inside the mirror housings (8,8'), and adapted to impart a rotation movement to the mirror housing with respect to the mirror foot (10,10') to transit from a driving to a parking position and vice versa.

The mirror feet (10,10') of the two assemblies (7,7'), are also constructed as a mirror image of each other.

As illustrated in FIG. 6, the set of external rear-view mirror assemblies (7,7') for a vehicle, features a symmetrical configuration both, from an aerodynamic and from a visual appearance points of view. The inclination of the driver's side rear view mirror (5) and the inclination of the passenger's side rear view mirror (5') relative to the driver's position (15), is optimized to provide proper rear view fields of view at both sides.

What is claimed is:

1. An external rear-view mirror assembly for vehicles, the assembly comprising:
    a mirror housing (8,8') with an opening,
    a frame (9,9') assembled at the opening of the mirror housing (8,8'),
    a mirror pane (5,5'),
    an actuator (6,6') accommodated inside the mirror housing (8,8'), and adapted for adjusting the position of the mirror pane (5,5') relative the mirror housing (8,8'),
    wherein the actuator (6,6') has a fixed part and a movable part relative the fixed part, wherein the mirror pane (5,5') is coupled to the movable part directly or indirectly through an intermediate or intermediate elements,
    wherein the movable part of the actuator (6,6') has a coupling surface (17) contained in a plane (X'-X'), and
    wherein the actuator (6,6') has a second contact surface (16) that contacts the mirror pane (5,5') or at least one intermediate element contacting with the actuator's second contact surface (16);
    wherein the second contact surface (16) is separate and distinct from the coupling surface (17) and is part of the movable part of the actuator, and
    wherein, the actuator (6,6') is provided with fixing means placed for attaching the actuator inside the mirror housing (8,8') in a specific fixing direction (11), and
    wherein the mirror pane (5,5') is inclined with respect to the coupling surface (17) of the actuator (6,6'), or wherein the mirror pane (5,5') is inclined with respect to the second contact surface (16) of the actuator (6,6');
    wherein the external rear-view mirror assembly comprises a single movable part connecting to the mirror pane.

2. The external rear-view mirror assembly according to claim 1, wherein the intermediate or intermediate elements is a back plate (1,1') coupled with the actuator (6,6'), wherein the mirror pane (5,5') is mounted on the back plate (1,1'), and wherein the back plate (1,1') is configured such that the mirror pane (5,5') is inclined with respect to the coupling surface (17) of the actuator (6,6'), or wherein the mirror pane (5,5') is inclined with respect to the second contact surface (16) of the actuator (6,6'), or wherein the mirror pane (5,5') is inclined with respect to an orthogonal direction to said fixing direction (11) of said fixing means.

3. The external rear-view mirror assembly according to claim 2, wherein the back plate (1,1') has a coupling surface (13) contained in a plane (X'-X') and wherein the actuator (6,6') and the back plate (1,1') are configured to be couplable to each other by bringing into contact their respective coupling surfaces (13,17) and contact surfaces (14,16), wherein the back plate (1,1') is additionally configured such that when the mirror pane (5,5') is mounted on the back plate (1,1'), the mirror pane (5,5') defines an angle (C. °) with respect to the coupling surface (13) of the back plate (1,1'), and wherein the angle (C. °) is preferably within the range 3°-8°.

4. The external rear-view mirror assembly according to claim 3, wherein the back plate (1,1') configuration includes a supporting plate (2, 2') having an outer surface for receiving the mirror pane (5,5'), and a coupling body (3,3') affixed to an internal surface of the supporting plate (2,2'), and configured to be anchored to the actuator (6,6'), wherein the thickness of the coupling body (3,3') from the internal surface, progressively increases from one side of the coupling body (3,3') to other side of the same, or wherein supporting plate (2,2') may have a tapered shape.

5. A set of external rear-view mirrors for vehicles, comprising two assemblies (7,7') as the one as defined in claim 4, wherein one assembly (7) is configured as driver-side rear-view mirror assembly, and the other assembly (7') is configured as passenger-side rear-view mirror assembly, and wherein the mirror housings (8,8') of both assemblies are conformed as a mirror image of each other, so that they can be placed in a symmetrical arrangement with respect to a plane of symmetry (Y-Y), and wherein when the two assemblies (7,7') are placed in that symmetrical arrangement, the mirror panes (5,5') of both assemblies are inclined with respect to the plane of symmetry (Y-Y), and wherein the inclination of the mirror pane (5') of the passenger-side rear-view mirror assembly (7'), is different than the inclination of the mirror pane (5) of the driver-side rear-view mirror assembly (7).

6. A set of external rear-view mirrors for vehicles, comprising two assemblies (7,7') as the one as defined in claim 3, wherein one assembly (7) is configured as driver-side rear-view mirror assembly, and the other assembly (7') is configured as passenger-side rear-view mirror assembly, and wherein the mirror housings (8,8') of both assemblies are conformed as a mirror image of each other, so that they can be placed in a symmetrical arrangement with respect to a plane of symmetry (Y-Y), and wherein when the two assemblies (7,7') are placed in that symmetrical arrangement, the mirror panes (5,5') of both assemblies are inclined with respect to the plane of symmetry (Y-Y), and wherein the inclination of the mirror pane (5') of the passenger-side rear-view mirror assembly (7'), is different than the inclination of the mirror pane (5) of the driver-side rear-view mirror assembly (7).

7. The external rear-view mirror assembly according to claim 2, wherein the back plate (1,1') configuration includes a supporting plate (2, 2') having an outer surface for receiving the mirror pane (5,5'), and a coupling body (3,3') affixed to an internal surface of the supporting plate (2,2'), and configured to be anchored to the actuator (6,6'), wherein the thickness of the coupling body (3,3') from the internal surface, progressively increases from one side of the coupling body (3,3') to other side of the same, or wherein supporting plate (2,2') may have a tapered shape.

8. A set of external rear-view mirrors for vehicles, comprising two assemblies (7,7') as the one as defined in claim 7, wherein one assembly (7) is configured as driver-side rear-view mirror assembly, and the other assembly (7') is configured as passenger-side rear-view mirror assembly, and wherein the mirror housings (8,8') of both assemblies are conformed as a mirror image of each other, so that they can be placed in a symmetrical arrangement with respect to a plane of symmetry (Y-Y), and wherein when the two assemblies (7,7') are placed in that symmetrical arrangement, the mirror panes (5,5') of both assemblies are inclined with respect to the plane of symmetry (Y-Y), and wherein the inclination of the mirror pane (5') of the passenger-side rear-view mirror assembly (7'), is different than the inclination of the mirror pane (5) of the driver-side rear-view mirror assembly (7).

9. A set of external rear-view mirrors for vehicles, comprising two assemblies (7,7') as the one as defined in claim 2, wherein one assembly (7) is configured as driver-side rear-view mirror assembly, and the other assembly (7') is configured as passenger-side rear-view mirror assembly, and wherein the mirror housings (8,8') of both assemblies are conformed as a mirror image of each other, so that they can be placed in a symmetrical arrangement with respect to a plane of symmetry (Y-Y), and wherein when the two assemblies (7,7') are placed in that symmetrical arrangement, the mirror panes (5,5') of both assemblies are inclined with respect to the plane of symmetry (Y-Y), and wherein the inclination of the mirror pane (5') of the passenger-side rear-view mirror assembly (7'), is different than the inclination of the mirror pane (5) of the driver-side rear-view mirror assembly (7).

10. A set of external rear-view mirrors for vehicles, comprising two assemblies (7,7') as the one as defined in claim 1, wherein one assembly (7) is configured as driver-side rear-view mirror assembly, and the other assembly (7') is configured as passenger-side rear-view mirror assembly, and wherein the mirror housings (8,8') of both assemblies are conformed as a mirror image of each other, so that they can be placed in a symmetrical arrangement with respect to a plane of symmetry (Y-Y), and wherein when the two assemblies (7,7') are placed in that symmetrical arrangement, the mirror panes (5,5') of both assemblies are inclined with respect to the plane of symmetry (Y-Y), and wherein the inclination of the mirror pane (5') of the passenger-side rear-view mirror assembly (7'), is different than the inclination of the mirror pane (5) of the driver-side rear-view mirror assembly (7);
wherein the mirror housings (8,8') and frames (9,9') assembled together, of both assemblies (7,7') are shaped such that when they are operatively attached to a vehicle, they would be symmetrical to each other when viewed from a front view and from a top plan view.

11. The set of external rear-view mirrors for vehicles according to claim 10, wherein the back plate (1,1') of both assemblies (7,7') are configured such that the inclination of the mirror pane (5') of the passenger-side rear-view mirror assembly (7'), is different than the inclination of the mirror pane (5) driver-side rear-view mirror assembly (7).

12. The set of external rear-view mirrors for vehicles according to claim 10, wherein the frames (9,9') of the assemblies (7,7') are asymmetrical, such that an inner part of each frame (9,9') defines an angle ($\alpha$, $\alpha'$) respectively with respect to the planes (R-R), (S-S), and wherein the angle ($\alpha'$) of the passenger side frame (9'), is greater than the angle ($\alpha$) of the driver side frame (9').

13. The set of external rear-view mirrors for vehicles according to claim 12, wherein an outer part of each frame (9,9') defines an angle ($\beta$, $\beta'$) respectively with respect to the planes (R-R), (S-S), and wherein the angle ($\beta$) of the driver side frame (9), is greater than the angle ($\beta'$) of the passenger side frame (9').

14. The set of external rear-view mirrors for vehicles according to claim 10, wherein when the driver-side rear-view mirror assembly (7) and the passenger-side rear-view mirror assembly (7') are positioned in the symmetrical arrangement with respect to the plane of symmetry (Y-Y), the mirror pane (5) of the driver-side rear-view mirror assembly (7) defines an angle (a°) with respect to a plane (Z-Z) that is orthogonal to the plane of symmetry (Y-Y), and the mirror pane (5') of the passenger-side rear-view mirror assembly (7') defines an angle (b°) with respect to the same plane (Z-Z) orthogonal to the plane of symmetry (Y-Y), and wherein the angle (b°) is greater than the angle (a°).

15. The set of external rear-view mirrors for vehicles according to claim 14, wherein the angle (a°) is within the range 15°-17°, and wherein the angle (b°) is within the range 25°-27°.

16. The set of external rear-view mirrors for vehicles according to claim 15, wherein the angle (a°) is 16°, and/or wherein the angle (b°) is 26°.

17. The set of external rear-view mirrors for vehicles according to claim 10, wherein the actuators (6,6') have the same shape and dimensions, and when the two assemblies (7,7') are positioned in the symmetrical arrangement with respect to the plane of symmetry (Y-Y), the actuators (6,6') are also symmetrically arranged with respect to each other.

18. The set of external rear-view mirrors for vehicles according to claim 10, wherein when the two assemblies (7,7') are positioned in the symmetrical arrangement with respect to the plane of symmetry (Y-Y), the outermost points of each frame (9,9') defines planes (R-R), (S-S) respectively, inclined with respect to the orthogonal plane (Z-Z), and that an angle (X°) between these planes (R-R), (S-S) and the orthogonal plane (Z-Z) is substantially the same.

19. The set of external rear-view mirrors for vehicles according to claim 18, wherein the mirror foot (10,10') of the two assemblies are constructed as a mirror image of each other.

20. The external rear-view mirror assembly of claim 1, wherein an angle of inclination of the mirror plane with respect to the coupling surface is in a range of 3 degrees to 8 degrees.

* * * * *